US012504509B2

United States Patent
Jaklitsch

(10) Patent No.: US 12,504,509 B2
(45) Date of Patent: Dec. 23, 2025

(54) CONVOLUTIONAL DIGITAL RADIO FREQUENCY MEMORY (DRFM) JAMMING

(71) Applicant: Textron Systems Corporation, Hunt Valley, MD (US)

(72) Inventor: James Joseph Jaklitsch, Parkton, MD (US)

(73) Assignee: Textron Systems Corporation, Hunt Valley, MD (US)

( * ) Notice: Subject to any disclaimer, the term of this patent is extended or adjusted under 35 U.S.C. 154(b) by 435 days.

(21) Appl. No.: 17/969,293

(22) Filed: Oct. 19, 2022

(65) Prior Publication Data

US 2023/0124074 A1    Apr. 20, 2023

Related U.S. Application Data

(60) Provisional application No. 63/257,812, filed on Oct. 20, 2021.

(51) Int. Cl.
*G01S 7/38* (2006.01)
*H03M 1/12* (2006.01)

(52) U.S. Cl.
CPC .............. *G01S 7/38* (2013.01); *H03M 1/1245* (2013.01)

(58) Field of Classification Search
CPC .............................. G01S 7/38; H03M 1/1245
See application file for complete search history.

(56) References Cited

U.S. PATENT DOCUMENTS

| 6,150,976 A | 11/2000 | Cooley |
| 6,624,780 B1 | 9/2003 | Fouts et al. |
| 7,443,337 B2 | 10/2008 | Jaklitsch |
| 7,719,457 B1 | 5/2010 | Tindall |
| 8,049,656 B2 | 11/2011 | Shani et al. |
| 8,830,112 B1 | 9/2014 | Buehler et al. |
| 10,852,391 B2 | 12/2020 | Cornic et al. |
| 11,811,507 B1 * | 11/2023 | Rios .................... H04K 3/45 |
| 2020/0213029 A1 | 7/2020 | Lee et al. |

(Continued)

FOREIGN PATENT DOCUMENTS

CN         112799023 A  *  5/2021

OTHER PUBLICATIONS

C. V. Ilioudis, C. Clemente and J. Soraghan, "Understanding the potential of Self-Protection Jamming on board of miniature UAVs," 2019 International Radar Conference (RADAR), Toulon, France, 2019, pp. 1-6, doi: 10.1109/RADAR41533.2019.171405. (Year: 2019).*

(Continued)

*Primary Examiner* — Vladimir Magloire
*Assistant Examiner* — Anna K. Gosling
(74) *Attorney, Agent, or Firm* — BainwoodHuang

(57) ABSTRACT

A technique of jamming a victim radar includes digitizing an incident waveform received from the victim radar and convolving the digitized waveform with contents of a range trace memory. The range trace memory stores a sequence of impulses, which, when convolved with the digitized waveform, creates a corresponding sequence of delayed versions of the digitized waveform, one for each impulse in the sequence, and adds together the delayed versions to produce a single output signal. The output signal is then converted to analog form and transmitted back toward the victim radar.

19 Claims, 4 Drawing Sheets

(56) References Cited

U.S. PATENT DOCUMENTS

2021/0109192 A1    4/2021   Keegan et al.

OTHER PUBLICATIONS

Q. Shi, Y. Wang, C. Wang, Q. Feng and N. Yuan, "A novel deceptive and blanket joint jammer," 2017 IEEE International Conference on Signal Processing, Communications and Computing (ICSPCC), Xiamen, China, 2017, pp. 1-4, doi: 10.1109/ICSPCC.2017.8242393. (Year: 2017).*

Shi Qingzhan et al: "A novel deceptive and blanket joint jammer", 2017 IEEE International Conference on Signal Processing, Communications and Computing (ICSPCC), IEEE, Oct. 22, 2017, pp. 1-4, XP033291168, DOI: 10.1109/ICSPCC.2017.8242393 (retrieved on Dec. 29, 2017), the whole document.

Zongbo Wang et al: "The hardware platform design for DRFM system", Signal Processing, 2008. ICSP 2008. 9th International Conference on, IEEE, Piscataway, NJ, USA, Oct. 26, 2008 (Oct. 26, 2008), pp. 426-430, XP031369083, DOI: 10.1109/ICOSP.2008.4697162 ISBN: 978-1-4244-2178-7 abstract; figure 1 p. 1, right-hand column lines 14-21, paragraph 2.

International Search Report and Written Opinion of the International Searching Authority, dated Feb. 2, 2023, for PCT application No. PCT/US2022/047123, filed on Oct. 19, 2022, 12 pages.

\* cited by examiner

CONVOLUTIONAL DIGITAL RADIO FREQUENCY MEMORY (DRFM) JAMMING

CROSS-REFERENCE TO RELATED APPLICATIONS

This application claims the benefit of U.S. Provisional Application No. 63/257,812, filed Oct. 20, 2021, the contents and teachings of which are incorporated herein by reference in their entirety.

BACKGROUND

This application is directed generally to radar jamming, and more specifically to radar jamming using digital radio frequency memory (DRFM) jammers.

Radar (radio detection and ranging) is an established technology used for determining the distance, angle, and radial velocity of objects in an environment. A typical radar system employs an antenna and electronic circuitry. The electronic circuitry generates radio frequency (RF) pulses, which the antenna transmits into the environment. The pulses travel through space and impinge upon objects, which reflect the pulses back toward the antenna. The antenna receives the reflected pulses, and the electronic circuitry processes the reflected pulses to determine the distance, angle, and radial velocity of the reflecting objects. Distances are determined based on round-trip times of the radar pulses. Given that RF signals travel at the speed of light, the distance to an object is one-half the product of the speed of light and the round-trip time. Angle may be determined based on the angle of the antenna, which generally rotates in azimuth as it emits and receives pulses, and radial velocity may be determined based on changes in phase of reflected pulses, also known as "Doppler."

As radar technology has evolved, features have been developed that represent radar pulses, which are short in duration but high in power, as waveforms that extend over longer durations but have lower power. Such waveforms may be generated using autocorrelation encoding (e.g., provided by chirping, non-linear frequency modulation, Barker codes, Frank codes, or the like). Radar systems can readily transform between waveforms and equivalent pulses, e.g., using filters.

FIG. 1a shows a typical radar waveform produced using an autocorrelation filter. The depicted waveform is an example of what a radar antenna typically transmits and receives. FIG. 1B shows the equivalent radar pulse, which may be represented internally by a radar system but is not typically transmitted or received. Notably, the waveform of FIG. 1a has relatively low power but extends over many microseconds, whereas the equivalent pulse of FIG. 1B has relatively high power but has much shorter duration, with most of the energy being concentrated in a single range bin. A "range bin" is a unit of radar distance, which corresponds to a uniform interval of time. A radar system may be capable of operating over hundreds or thousands of range bins. As an example, a single range bin may correspond to a distance of 53 meters (e.g., based on a pulse width of 25.6 microseconds and a chirp bandwidth of 2.9 MHz), but range bins for other waveforms may correspond to different distances. The autocorrelation depicted in FIGS. 1a and 1b reflects a compression ratio (time-bandwidth product) of 74:1. Other waveforms may use different compression ratios, and compression ratios of 1000:1 are commonly used. A typical radar system transmits waveforms, like the one shown in FIG. 1a, and receives back reflections of those waveforms from objects in the environment. The radar system transforms the reflected waveforms into equivalent pulses (like FIG. 1b), which form the basis for distance and radial-velocity measurements.

One benefit of transmitting waveforms rather than short pulses is that waveforms can be more difficult to jam. For example, any waveform received by a radar system must have substantially the same structure as the transmitted waveform, in order for the radar to successfully convert the reflected waveform into a pulse. This means that received waveforms having different structures from transmitted waveforms are typically rejected and thus may be ineffective for purposes of jamming.

Conventional digital radio frequency memory (DRFM) jammers were developed at least in part to address the complex problem of jamming radar waveforms. FIG. 2 shows a conventional DRFM jammer 200. The DRFM jammer 200 works by digitizing and recording an incident radar waveform from a radar system (also referred to herein as a "victim radar") and transmitting the recorded waveform back to the radar system delayed in time. For example, the DRFM jammer 200 includes a receiving antenna 210 and a mixer 220, configured to downconvert an incident waveform received by the antenna 210 using a local oscillator 230. In an example, the local oscillator (LO) 230 is tuned to an expected carrier frequency of the waveform to be jammed. The mixer 220 produces I (in-phase, or real) and Q (quadrature, or imaginary) output signals, which represent the received waveform with the carrier frequency removed. An analog-to-digital converter (ADC) 240 converts the I and Q signals into respective sequences of digital samples, and a digital memory 250 stores the samples in time order. After some determined time interval, the digital memory 250 plays out the I and Q samples to a digital-to-analog converter (DAC) 260, in the same order as acquired, and the DAC 260 converts the samples back to an analog waveform, which thus provides a delayed version of the downconverted waveform. A mixer 270 upconverts the analog waveform to generate an output waveform, by adding back the carrier frequency (from LO 230). An amplifier 280 boosts the power of the output waveform, and the antenna 290 transmits the output waveform back toward the victim radar. The antenna 290 may be the same as the antenna 210 or it may be separate.

By transmitting the output waveform as a delayed version of the incident waveform, the DRFM jammer 200 can fool the victim radar into detecting a radar target at an incorrect distance. For example, each increment of time delay corresponds to a difference in distance, with a delay of 7.8 microseconds corresponding to approximately one radar kilometer. Sending back a delayed waveform can thus fool the victim radar into concluding that a target object is farther away than it actually is. In some examples, a spoofing effects generator 252 can provide additional content that further confounds the victim radar, such as by adding phase shifts or other effects. Delay can be varied over time, to give the impression of false movement of the target. In addition, the contents of the digital memory 250 can be played back multiple times, to simulate the presence of multiple false targets instead of just one.

SUMMARY

Unfortunately, prior DRFM solutions have limited abilities. For example, the above-described DRFM jammer can normally generate only a single false target at a time, as it must typically play out the contents of its memory completely before it can start playing the contents out again. As incident waveforms extend over multiple range bins of the victim radar (74 in the example of FIGS. 1a and 1b), the need to wait until one false target is completely played out before starting the next one means that most range bins of the victim radar are left empty (e.g., 73 out of every 74 range bins). Such sparse provision of false targets may be insufficient for some implementations. What is needed, therefore, is a more flexible solution that places fewer constraints on the generation of false targets.

In contrast with the above-described prior DRFM solution, an improved technique of jamming a victim radar includes digitizing an incident waveform received from the victim radar and convolving the digitized waveform with contents of a range trace memory. The range trace memory stores a sequence of impulses, which, when convolved with the digitized waveform, creates a corresponding sequence of delayed versions of the digitized waveform, one for each impulse in the sequence, and adds together the delayed versions to produce a single output signal. The output signal is then converted to analog form and transmitted back toward the victim radar.

Advantageously, the act of convolving the digitized waveform with impulses in the range trace memory produces a superposition of delayed waveforms. Rather than having to wait for a digital memory to be played out completely before it can start to be played out again, the improved technique effectively plays out the waveform memory once for each impulse in the range trace memory and adds the results together. Impulses in the range trace memory may be separated by as little as a single range bin, meaning that delayed waveforms may be generated up to once per range bin of the victim radar. The victim radar is thus made to detect much more closely-spaced false targets than were possible in the prior scheme, and the number of such false targets can be much larger than was previously possible, up to the total number of range bins, for example.

Certain embodiments are directed to a method of jamming a victim radar. The method includes digitizing an incident waveform received from the victim radar, convolving the digitized waveform with a series of impulses of a range trace memory to produce a digital output signal, and converting the digital output signal to analog form for transmission back to the victim radar.

In some examples, the incident waveform has a duration, and convolving the digitized waveform with the series of impulses of the range trace memory includes convolving the digitized waveform with at least two impulses separated in time by less than the duration of the incident waveform.

In some examples, the duration of the incident waveform extends across N range bins of the victim radar, the range bins having uniform range-bin duration, and convolving the digitized waveform with the series of impulses of a range trace memory includes convolving the digitized waveform with N impulses separated in time by the range-bin duration.

In some examples, the duration of the incident waveform extends across N range bins of the victim radar, the range bins having uniform range-bin duration, and the method further includes clocking the range trace memory to output a new stored value at a rate of once per range-bin duration, such that the act of convolving produces at most one false target per range bin.

In some examples, the method further includes generating the impulses of the range trace memory to reflect a desired number and spacing of false targets.

In some examples, generating the impulses of the range trace memory includes varying amplitudes of the impulses to simulate false targets having different sizes.

In some examples, generating the impulses of the range trace memory includes varying phases of the impulses to simulate targets having different radial velocities.

In some examples, the method further includes varying the impulses of the range trace memory over time to reflect a changing environment.

In some examples, the method further includes generating the impulses of the range trace memory in real time, as the victim radar moves, to simulate movement of the victim radar through a synthesized or partially synthesized environment.

In some examples, the acts of digitizing, convolving, and returning are performed by electronic circuitry of a UAV (unmanned aerial vehicle).

Other embodiments are directed to a convolutional digital radio frequency memory (DRFM) jammer. The convolutional DRFM jammer includes an analog-to-digital converter (ADC) constructed and arranged to digitize an incident waveform received from a victim radar, a convolution processor constructed and arranged to convolve the digitized waveform with a series of impulses of a range trace memory to produce a digital output signal, and a digital-to-analog converter constructed and arranged to convert the digital output signal to analog form for transmission back to the victim radar.

In some examples, the incident waveform has a duration, and the convolution processor constructed and arranged to convolve the digitized waveform with the series of impulses of a range trace memory is further constructed and arranged to convolve the digitized waveform with at least two impulses separated in time by less than the duration of the incident waveform.

In some examples, the duration of the incident waveform extends across N range bins of the victim radar, the range bins having uniform range-bin duration, and the convolution processor constructed and arranged to convolve the digitized waveform with the series of impulses of a range trace memory is further constructed and arranged to convolve the digitized waveform with N impulses separated in time by the range-bin duration.

In some examples, the duration of the incident waveform extends across N range bins of the victim radar, the range bins having uniform range-bin duration, and the range trace memory is constructed and arranged to output a new stored value at a rate of once per range-bin duration, such that the act of convolving produces at most one false target per range bin.

In some examples, the impulses of the range trace memory are configured to reflect a desired number and spacing of false targets.

In some examples, the convolutional DRFM jammer further includes control circuitry constructed and arranged to vary amplitudes of the impulses of the range trace memory to simulate false targets having different sizes.

In some examples, the convolutional DRFM jammer further includes control circuitry constructed and arranged to vary phases of the impulses of the range trace memory to simulate targets having different radial velocities.

In some examples, the convolutional DRFM jammer further includes control circuitry constructed and arranged to vary the impulses of the range trace memory over time to reflect a changing environment.

In some examples, the convolutional DRFM jammer further includes control circuitry constructed and arranged to generate the impulses of the range trace memory in real time, as the victim radar moves, to simulate movement of the victim radar through a synthesized or partially synthesized environment.

In some examples, the convolution processor is implemented at least in part using an FPGA (field-programmable gate array).

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique of jamming a victim radar includes digitizing an incident waveform received from the victim radar and convolving the digitized waveform with contents of a range trace memory. The range trace memory stores a sequence of impulses, which, when convolved with the digitized waveform, creates a corresponding sequence of delayed versions of the digitized waveform, one for each impulse in the sequence, and adds together the delayed versions to produce a single output signal. The output signal is converted to analog form and transmitted back toward the victim radar.

Figure 3:
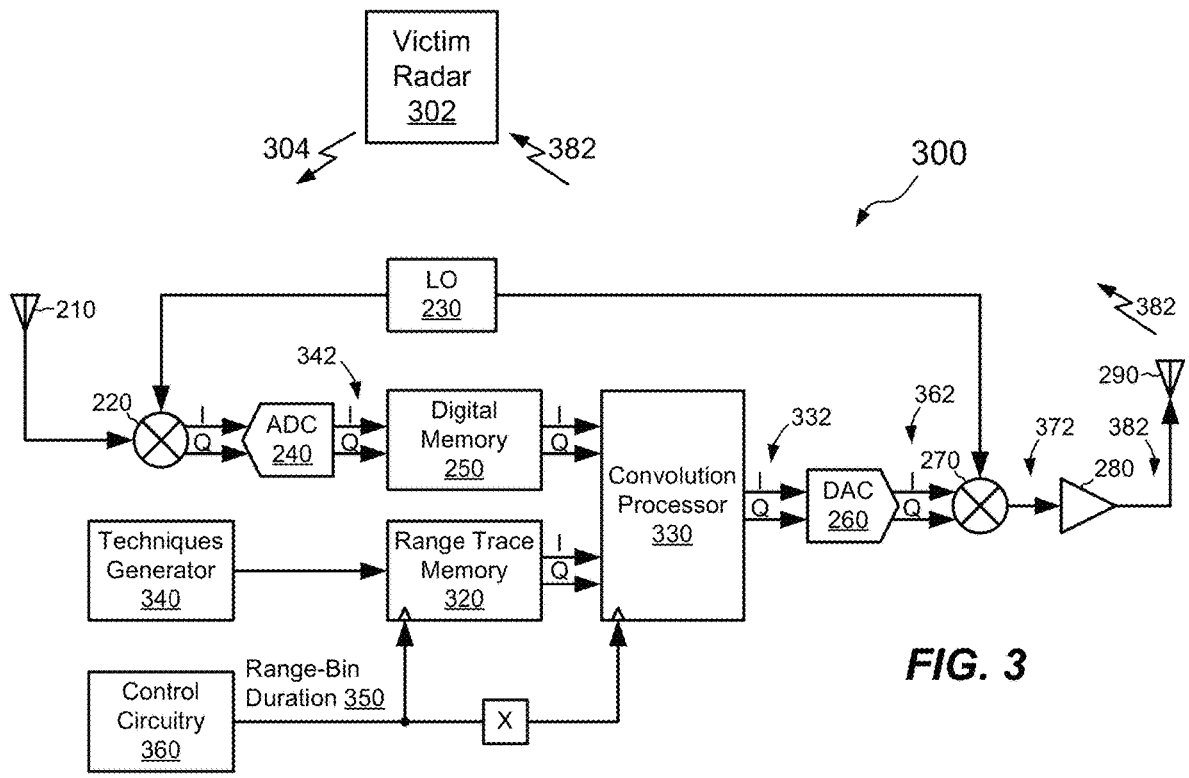
FIG. 3 is a block diagram of a convolutional DRFM jammer in accordance with embodiments of the disclosure.

FIG. 3 shows an example convolutional DRFM jammer 300 in accordance with the instant disclosure. The convolutional DRFM jammer 300 has many features in common with the prior DRFM jammer 200, such as antennas 210 and 290 (which may be the same antenna in some embodiments), mixers 220 and 270, local oscillator 230, ADC 240, digital memory 250, DAC 260, and amplifier 280. The convolutional DRFM jammer 300 includes additional components, however, which are not part of the prior DRFM jammer 200, such as a range trace memory 320, a convolutional processor 330, and a techniques generator 340. The convolutional DRFM jammer 300 further includes control circuitry 360. The control circuitry 360 may include one or more processors, such as microprocessors, microcontrollers, digital-signal processors, and/or the like, as well as memory. The memory stores instructions, which when executed by the processor(s) cause the processor(s) to perform various methods and operations as described herein. Although the convolutional processor 330 is shown as being separate from the control circuitry 360, some embodiments may implement the convolutional processor 330 using the control circuitry 360, e.g., such as using software or firmware that runs on the control circuitry 360.

The range trace memory 320 is configured to store a series of impulses, i.e., digital values corresponding to short-duration pulses, where each impulse represents a synthesized radar reflector. For example, each impulse in the range trace memory 320 represents a respective I-Q phasor. The range trace memory 320 is further configured to output stored values (e.g., impulses or zero-values) at a determined rate, such as once per range-bin duration 350. For example, a victim radar 302 measures distance in range bins that correspond to uniform time intervals, and the size of the range bins may be determined by control circuitry 360, for example, based on bandwidth of incident radar waveforms.

Figure 1A:
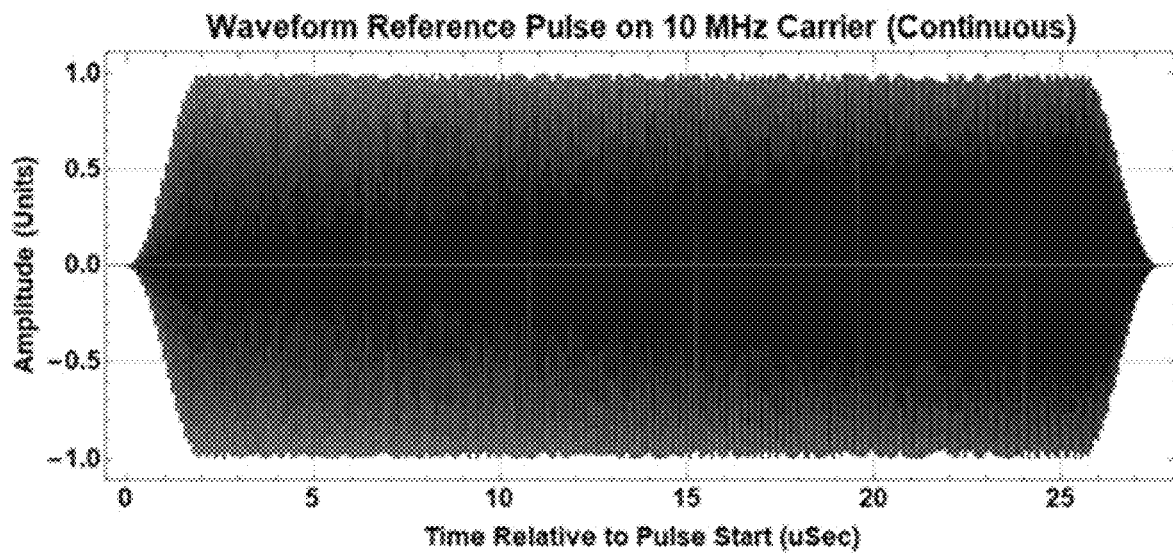
FIGS. 1a and 1b are graphs showing an example radar waveform produced by an autocorrelation filter (FIG. 1a) and a radar pulse (FIG. 1B) that corresponds to the radar waveform.
Figure 1B:
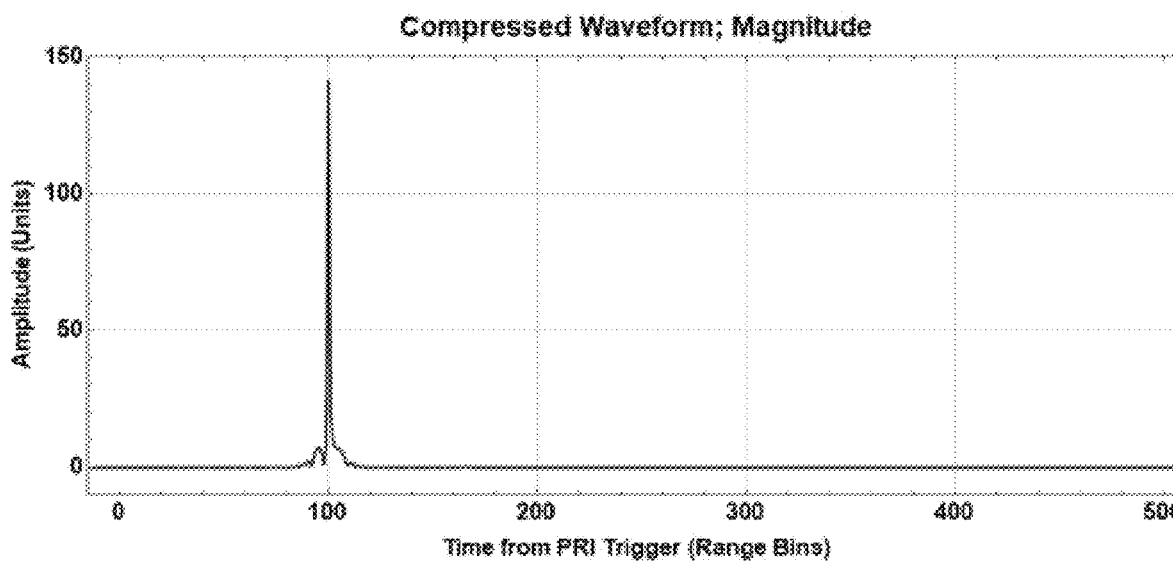
Figure 2:
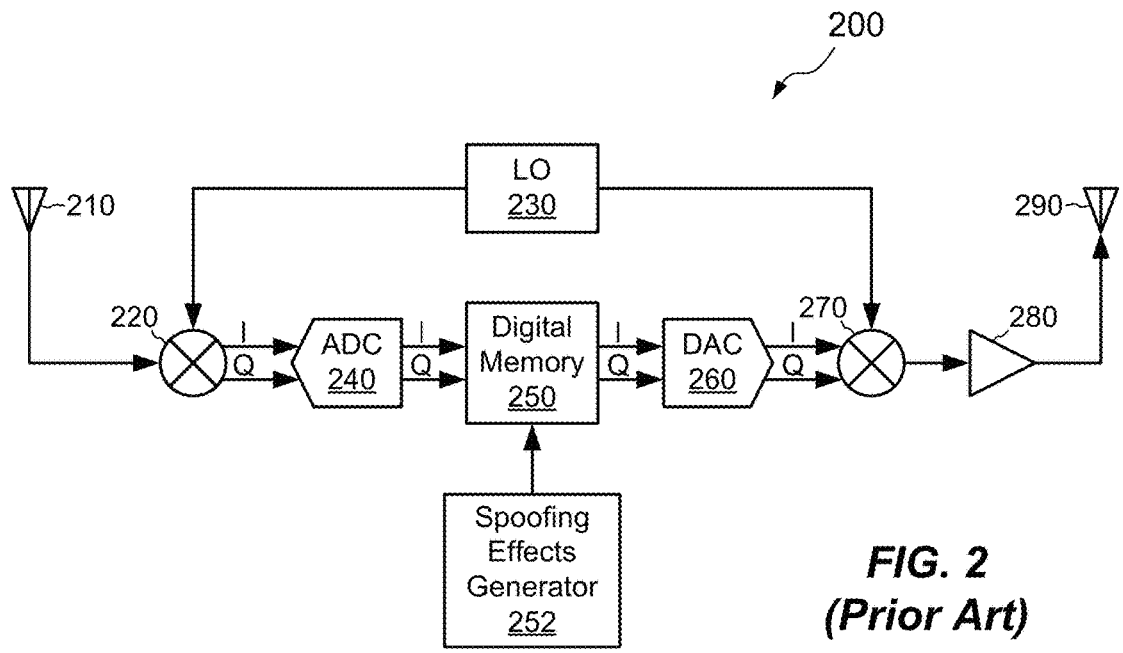
FIG. 2 is a block diagram of a DRFM jammer of the prior art.

The convolutional processor 330 is constructed and arranged to convolve stored radar waveforms, like the one shown in FIG. 1a, with the series of impulses stored in the range trace memory 320. The act of convolving these inputs causes a radar waveform stored in the digital memory 250 (e.g., a captured waveform from the victim radar 302) to be played back once for each impulse of the range trace memory 320, at a delay established based on the placement of the respective impulse in time. For example, a first impulse placed at a delay of one range-bin duration 350 results in the convolution processor 330 generating a version of the captured waveform delayed by one range-bin duration 350. Likewise, a second impulse placed at a delay of five range-bin durations 350 results in the convolution processor 330 generating another version of the captured waveform delayed by five range-bin durations 350. The first impulse and the second impulse are separated in time by only four range bins, which is much less than the width of the incident waveform. Owning to the additive nature of convolutional processing, the two versions are added together, such that a digital output signal 332 from the convolutional processor 330 provides a sum of all of the generated, delayed versions. As the range trace memory 320 may include one impulse per range-bin duration 350 (e.g., as an upper limit), the convolution processor 330 may generate and sum together as many delayed versions of the captured waveform as there are range bins.

Convolution is a well-known operation in the field of digital signal processing, and many devices are currently available for performing this operation. Examples of such devices include digital signal processors and FPGAs (field programmable gate arrays) designed for this purpose. Indeed, standard finite impulse response (FIR) filters inherently perform convolution and may be used for implementing the convolution processor 330.

The techniques generator 340 is configured to generate contents of the range trace memory 320, such as impulses that represent synthetic environments or synthetic features within an environment. Given that the range trace memory 320 can place impulses in any range bin of the victim radar 302, range trace memory 320 is able to simulate artificial features, such as hills, mountains, buildings, aircraft, or the like, which are not actually present in the environment or are not present as they are made to appear.

One should appreciate that the illustrated components of the convolutional DRFM jammer 300 are presented in simplified form for ease of understanding. For example, mixers 220 and 270 may be implemented with multiple mixing stages and may each include amplifiers, filters, and other components. ADC 240 and DAC 260 may be specially configured for handling quadrature sampling, or separate converters may be provided for handling I and Q samples, respectively. The depicted embodiment is thus intended to be illustrative and instructive, rather than limiting to particular details. Such details are well within the ability of persons of ordinary skill given the teachings of the instant disclosure.

In example operation, the victim radar 302 scans its environment by emitting radar waveforms 304, e.g., like the one shown in FIG. 1a (but modulated on a carrier frequency). The victim radar 302 may be ground based, ship based, space-based, or airborne, for example. Thus, the victim radar 302 is not necessarily stationary but may itself be moving. Likewise, the convolutional DRFM jammer 300 may be stationary or moving. In a particular example, the convolutional DRFM jammer 300 is provided on or within an aircraft, such as a UAV (unmanned aerial vehicle), which may be a sole UAV or part of a UAV swarm, for example.

When the victim radar 302 emits a radar waveform 304, the convolutional DRFM jammer 300 may receive the waveform 304 (e.g., via antenna 210), downconvert the waveform to remove its carrier frequency (e.g., via mixer 220 and LO 230), and digitize the downconverted waveform (e.g., using ADC 240). A resulting digitized waveform 342, e.g., including both I and Q components, is stored in digital memory 250.

The convolution processor 330 then convolves the digitized waveform 342, as stored in the digital memory 250, with the series of impulses stored in the range trace memory 320. For example, the range trace memory 320 and convolution processor 330 may both be clocked at a rate based on range-bin duration 350, such that a new step in the convolution processing takes place for every range bin. The resulting digital output signal 332 provides a sum of delayed versions of the digitized waveform 342. In some examples, the convolution processor 330 may be clocked at a higher frequency than the range trace memory 320, e.g., once per sample of the digital memory 250 (with samples played out at the same rate at which they were acquired).

DAC 260 converts the output signal 332 to an analog signal 362, and the mixer 270 upconverts the analog signal 362, by adding back the carrier frequency from LO 230, thereby producing upconverted signal 372. Amplifier 280 boosts the upconverted signal 372, providing boosted signal 382, and antenna 290 (which may be the same as antenna 210 or different) transmits the boosted signal 382 back to the victim radar 302. The victim radar 302 then receives the boosted signal 382 and processes it, e.g., using autocorrelation techniques.

What the victim radar 302 renders is not merely a map of the real environment, however, but rather also includes the synthetic content that has been added by the impulses stored in range trace memory 320. Preferably, the amplifier 280 provides enough gain such that the synthetic content sent back to the victim radar 302 is at least a few dB stronger than the true (skin) reflections, such that the victim radar 302 locks onto and tracks the synthetic content and ignores the true content.

Given the flexibility of the range trace memory 320, the convolutional DRFM jammer 300 can generate a wide range of confounding content. Such content may include, for example, generating multiple false images of a single real target, which false targets may be spaced arbitrarily close together (e.g., separated by as little as one range bin), and which may obscure the location of the true target. Given that radar waveforms 304 are typically repeated at regular intervals (e.g., once per millisecond), the range trace memory 320 can include an impulse that is delayed far enough so that it arises during the next interval, and thus appears closer to the victim radar 302 than the true target. False targets can be produced in any number of range bins, including all of them, thus potentially illuminating an entire range trace of the victim radar 302 and effectively blinding the victim radar 302.

Also, range gate and/or velocity gate pull-off effects can be easily achieved. For example, an I-Q phasor that starts in the same range bin as the skin return, but with greater magnitude, can be slowly moved away in range and Doppler (range being the relative delay with respect to the skin return; Doppler being the pulse-to-pulse rotation of the I-Q phasor).

AM (amplitude modulation), FM (frequency modulation), and/or PM (phase modulation) can be easily added by modulating the I-Q phasors (impulses in the range trace memory 320), e.g., by applying amplitude, frequency, or phase modulation, respectively. Varying the amplitude of an I-Q phasor for a false target may cause the target to appear larger or smaller, while varying the phase may cause the target to appear with different radial velocities.

In addition, contents of the range trace memory 320 may be varied over time, e.g., to reflect a changing environment. Such contents may be changed in real time, e.g., in response to evolving situations. In some examples, contents of the range trace memory 320 may be changed in real time to reflect changes in the location of the victim radar 302. For example, different scenes may be applied for different locations of the victim radar as the victim radar 302 moves through a synthesized or partially synthesized environment.

In an example, the convolutional DRFM jammer 300 has limited size, weight, and power (SWAP), such that it is suitable for battery-powered, mobile operation. Given that the convolutional DRFM jammer 300 does not itself require detection of reflections of boosted signals 282, it may emit signals 282 at moderate power levels, e.g., just enough to ensure that the victim radar 302 can receive them, preferably, somewhat more strongly than it receives skin reflections.

Figure 4:
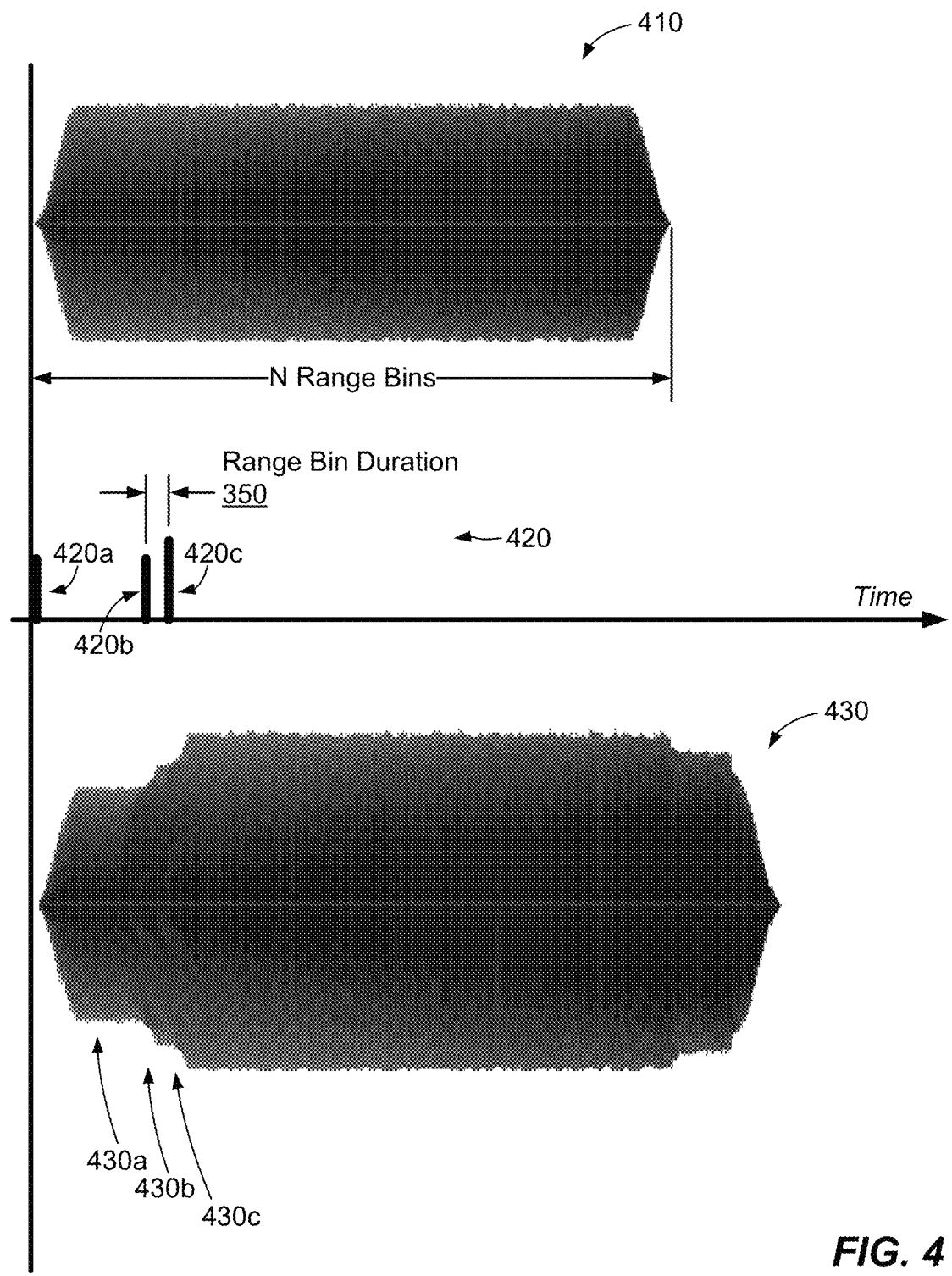
FIG. 4 is a diagram showing an example convolution of an incident radar waveform with a series of impulses of a range trace memory of FIG. 3.

FIG. 4 shows example operation of the convolution processor 330 in greater detail. Here, a first input of the convolution processor 330 receives a digitized waveform 410, such as a stored version of the digitized waveform 342. In an example, the digitized waveform 410 includes both I and Q components and represents the downconverted version of the incident waveform 304. The convolution processor 330 has a second input that receives a series 420 of impulses from the range trace memory 320, where each impulse may be provided as a respective I-Q phasor, having both magnitude and phase.

In the particular example shown, three impulses are provided. A first impulse 420a appears in a first range bin, which may be coincident with a skin reflection, for example. A second impulse 420b appears somewhat later, and a third impulse 420c appears just one range bin after the second impulse 420b. The first and second impulses 420a and 420b have the same magnitude, and the third impulse 420c has a slightly larger magnitude, e.g., for simulating a stronger reflection. Although only three impulses are shown, a great many more impulses may be provided, e.g., up to one impulse per range bin. For example, the radar waveform 410 may extend over N range bins of the victim radar 302, and a different impulse may be provided in each range bin. Notably, however, range bins are not limited to the width of the radar waveform 410 but may rather extend much farther, being limited only by the victim radar 302 and practical range considerations.

Signal 430 represents example results of the convolution processing, such as what appears in the digital signal 332 and (after conversion) in the subsequent analog signal 362 (which is upconverted and sent back to the victim radar 302). Multiple delayed versions of the input 410 appear, with the results from the different impulses summed together. For example, a first portion 430a of the signal 430 starts during the first range bin, coincidently with the first impulse 420a. A second portion 430b starts in a later range bin, coincidently with the second impulse 430b. A third portion 430s starts one range bin later, coincidently with the third impulse 430c. As the effect of each impulse is added, the signal 430 becomes larger, reflecting the summation of a new delayed instance of the waveform 410. Likewise, as the effect of each impulse ends, the signal 430 becomes smaller. The contributions from the different impulses do not add linearly, but rather statistically, e.g., as the root sum square of the individual amplitudes. This property of statistical adding limits the size of the signal 430, and thus the power required to transmit the boosted signal back to the victim radar 302, allowing the convolution DRFM jammer 300 to be an excellent fit for SWAP applications.

Figure 5:
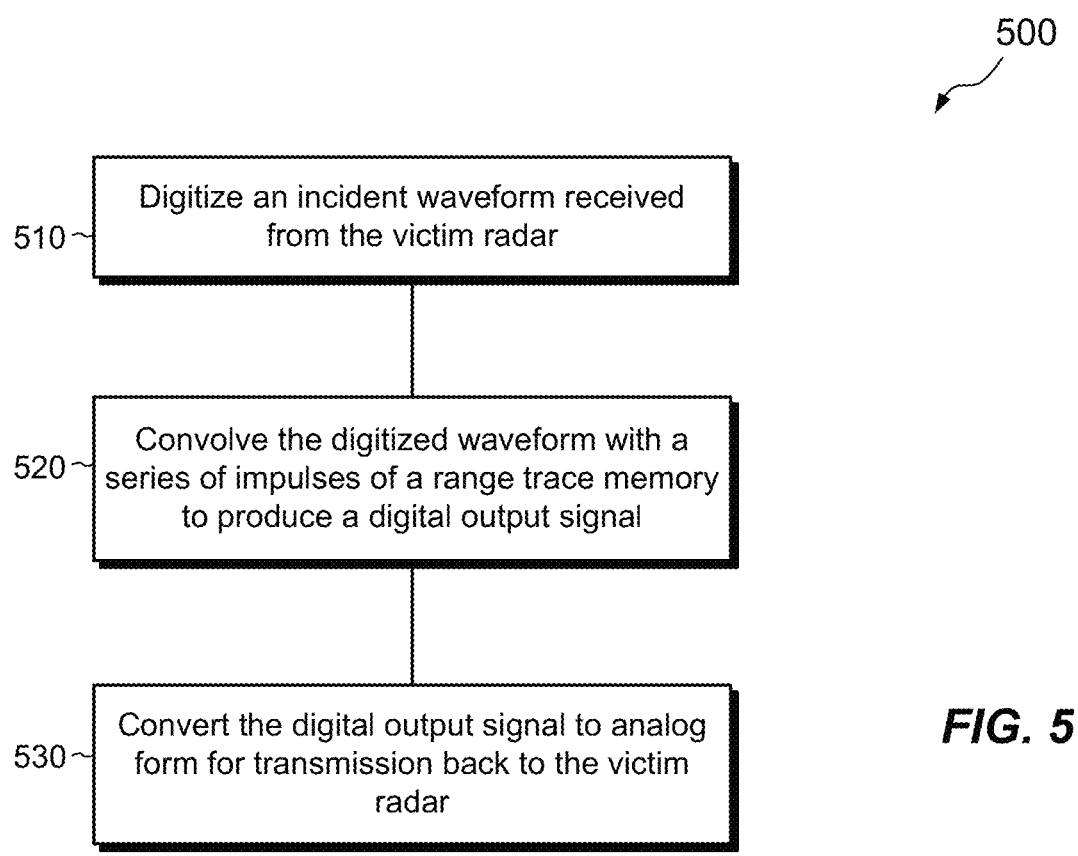
FIG. 5 is a flowchart that shows an example method of jamming a victim radar.

FIG. 5 shows an example method 500 of jamming a victim radar, such as victim radar 302, and summarizes some of the features described above. The method 500 may be performed, for example, by the convolutional DRFM jammer 300, e.g., with contributions from the range trace memory 320, convolution processor 330, techniques generator 340, and control circuitry 350. The illustrated acts may be performed in any suitable order, which may include performing some acts simultaneously.

At 510, an incident waveform 304 received from the victim radar 302 is digitized, e.g., by ADC 240 after the waveform 304 is received by antenna 210 and downconverted by mixer 220 and local oscillator 230. The resulting digitized waveform 342 may be stored in digital memory 250, for example.

At 520, the digitized waveform 342 is convolved, e.g., by convolution processor 330, with a series 420 of impulses of a range trace memory 320 to produce a digital output signal, such as digital output signal 332.

At 530, the digital output signal 332 is converted to analog form, e.g., by DAC 260, for transmission back to the victim radar 302, e.g., by upconverting the digital output signal 332 (e.g., using mixer 270 and local oscillator 230), boosting the upconverted signal using amplifier 280, and providing the boosted signal 383 to the antenna 290 (or 210).

An improved technique has been described for jamming a victim radar 302. The technique includes digitizing an incident waveform 304 received from the victim radar 302 and convolving the digitized waveform 342 with contents of a range trace memory 320. The range trace memory 320 stores a sequence 420 of impulses, which, when convolved with the digitized waveform 342, creates a corresponding sequence of delayed versions (430a, 430b, 430c, etc.) of the digitized waveform 342, one for each impulse in the sequence 420, and adds together the delayed versions (430a, 430b, 430c, etc.) to produce a single output signal 430. The output signal is then converted to analog form and transmitted back toward the victim radar 302.

Rather than having to wait for the digital memory to be played out completely before it can start to be played out again, the improved technique effectively plays out the waveform memory once for each impulse in the range trace memory and adds the results together. The victim radar is thus made to detect much more closely-spaced false targets than were possible in the prior scheme, and the number of such false targets can be much larger than was previously possible, up to the total number of range bins, for example.

Having described certain embodiments, numerous alternative embodiments or variations can be made. For example, although embodiments have been described in relation to UAVs, the techniques disclosed herein are not limited to UAVs but may rather be used in any context in which radar is used.

Also, although the disclosed embodiments show a particular arrangement of components, such as mixers, converters, an amplifier, and the like, these are shown merely for illustrative purposes to demonstrate example operation. Actual convolutional DRFM jammers may be arbitrarily complex in their design, and nothing herein should be construed as requiring any particular design or topology.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of jamming a victim radar, comprising:
   digitizing an incident waveform received from the victim radar;
   convolving the digitized waveform with a series of impulses of a range trace memory to produce a digital output signal; and
   converting the digital output signal to analog form for transmission back to the victim radar,
   wherein the incident waveform represents a radar pulse and has a duration, and wherein convolving the digitized waveform with the series of impulses of the range trace memory includes convolving the digitized waveform with at least two impulses separated in time by less than the duration of the incident waveform, and
   wherein the duration of the incident waveform extends across N range bins of the victim radar, the range bins having uniform range-bin duration, and wherein convolving the digitized waveform with the series of impulses of a range trace memory includes convolving the digitized waveform with N impulses separated in time by the range-bin duration.

2. The method of claim 1, wherein the method further comprises clocking the range trace memory to output a new stored value at a rate of once per range-bin duration, such that the act of convolving produces at most one false target per range bin.

3. The method of claim 1, further comprising generating the impulses of the range trace memory to reflect a desired number and spacing of false targets.

4. The method of claim 3, wherein generating the impulses of the range trace memory includes varying amplitudes of the impulses to simulate false targets having different sizes.

5. The method of claim 3, wherein generating the impulses of the range trace memory includes varying phases of the impulses to simulate targets having different radial velocities.

6. The method of claim 3, further comprising varying the impulses of the range trace memory over time to reflect a changing environment.

7. The method of claim 3, further comprising generating the impulses of the range trace memory in real time, as the victim radar moves, to simulate movement of the victim radar through a synthesized or partially synthesized environment.

8. The method of claim 3, wherein the acts of digitizing, convolving, and returning are performed by electronic circuitry of a UAV (unmanned aerial vehicle).

9. A convolutional digital radio frequency memory (DRFM) jammer, comprising:
   an analog-to-digital converter (ADC) constructed and arranged to digitize an incident waveform received from a victim radar;
   a convolution processor constructed and arranged to convolve the digitized waveform with a series of impulses of a range trace memory to produce a digital output signal; and
   a digital-to-analog converter constructed and arranged to convert the digital output signal to analog form for transmission back to the victim radar,
   wherein the incident waveform represents a radar pulse and has a duration, and wherein the convolution processor constructed and arranged to convolve the digitized waveform with the series of impulses of the range trace memory is further constructed and arranged to convolve the digitized waveform with at least two impulses separated in time by less than the duration of the incident waveform, and
   wherein the duration of the incident waveform extends across N range bins of the victim radar, the range bins having uniform range-bin duration, and wherein the convolution processor constructed and arranged to convolve the digitized waveform with the series of impulses of a range trace memory is further constructed and arranged to convolve the digitized waveform with N impulses separated in time by the range-bin duration.

10. The convolutional DRFM jammer of claim 9, wherein the range trace memory is constructed and arranged to output a new stored value at a rate of once per range-bin duration, such that the act of convolving produces at most one false target per range bin.

11. The convolutional DRFM jammer of claim 9, wherein the impulses of the range trace memory are configured to reflect a desired number and spacing of false targets.

12. The convolutional DRFM jammer of claim 11, further comprising control circuitry constructed and arranged to vary amplitudes of the impulses of the range trace memory to simulate false targets having different sizes.

13. The convolutional DRFM jammer of claim 11, further comprising control circuitry constructed and arranged to vary phases of the impulses of the range trace memory to simulate targets having different radial velocities.

14. The convolutional DRFM jammer of claim 11, further comprising control circuitry constructed and arranged to vary the impulses of the range trace memory over time to reflect a changing environment.

15. The convolutional DRFM jammer of claim 11, further comprising control circuitry constructed and arranged to generate the impulses of the range trace memory in real time, as the victim radar moves, to simulate movement of the victim radar through a synthesized or partially synthesized environment.

16. The convolutional DRFM jammer of claim 9, wherein the convolution processor is implemented at least in part using an FPGA (field-programmable gate array).

17. The convolutional DRFM jammer of claim 9, wherein the convolution processor constructed and arranged to convolve the digitized waveform with at least two impulses separated in time by less than the duration of the radar pulse is further constructed and arranged to produce the digital output signal as a sum of at least two radar pulses that partially overlap in time.

18. The method of claim 1, wherein convolving the digitized waveform with at least two impulses separated in time by less than the duration of the radar pulse includes producing the digital output signal as a sum of at least two radar pulses that partially overlap in time.

19. The method of claim 1, wherein convolving the digitized waveform with the series of impulses of the range trace memory is performed by an FIR (finite impulse response) filter.

* * * * *